United States Patent
Leblanc et al.

(10) Patent No.: US 9,736,720 B2
(45) Date of Patent: Aug. 15, 2017

(54) MODIFYING FEEDBACK INFORMATION TO CONTROL A SOURCE DEVICE

(71) Applicant: Aruba Networks Inc., Sunnyvale, CA (US)

(72) Inventors: Bill Leblanc, Sunnyvale, CA (US); Richard Howes, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 308 days.

(21) Appl. No.: 14/170,521

(22) Filed: Jan. 31, 2014

(65) Prior Publication Data

US 2015/0223105 A1    Aug. 6, 2015

(51) Int. Cl.
*H04W 36/00* (2009.01)
*H04W 28/02* (2009.01)
*H04L 12/825* (2013.01)
*H04L 12/26* (2006.01)

(52) U.S. Cl.
CPC ....... *H04W 28/0242* (2013.01); *H04L 47/263* (2013.01); *H04L 43/0835* (2013.01)

(58) Field of Classification Search
CPC . H04W 36/08; H04W 12/06; H04W 36/0083; H04W 36/165
USPC ........................................ 370/331, 332, 338
See application file for complete search history.

(56) References Cited

U.S. PATENT DOCUMENTS

| | | | |
|---|---|---|---|
| 7,668,140 B2* | 2/2010 | Van Bemmel | 370/331 |
| 7,975,063 B2* | 7/2011 | Lefebvre | H04N 21/23805 370/231 |
| 7,983,220 B2* | 7/2011 | Kurita et al. | 370/331 |
| 8,626,875 B2* | 1/2014 | Viveganandhan | H04L 65/4084 709/219 |
| 2004/0264366 A1* | 12/2004 | Swami | 370/229 |
| 2008/0084821 A1* | 4/2008 | Maze | H04L 43/0847 370/232 |
| 2008/0301516 A1* | 12/2008 | Han | H04L 1/1812 714/748 |
| 2009/0116399 A1* | 5/2009 | Ho et al. | 370/252 |
| 2009/0154356 A1* | 6/2009 | Wiemann | H04L 1/1809 370/236 |
| 2012/0163343 A1* | 6/2012 | Ahluwalia | 370/331 |
| 2013/0041822 A1* | 2/2013 | Wagner | G06Q 20/32 705/44 |
| 2014/0148155 A1* | 5/2014 | Batta | H04W 36/0083 455/432.1 |
| 2014/0241323 A1* | 8/2014 | Park et al. | 370/332 |
| 2015/0172985 A1* | 6/2015 | Gangadhar et al. | 370/331 |

* cited by examiner

*Primary Examiner* — Sai Aung
(74) *Attorney, Agent, or Firm* — Brooks, Cameron & Huebsch, PLLC

(57) ABSTRACT

A non-transitory computer readable medium includes instructions which, when executed by one or more processors cause performance of operations, including: receiving feedback information related to a receipt of packets by a receiving device, the packets being transmitted by a source device, modifying the feedback information to obtain modified information related to the receipt of the packets by the receiving device, and transmitting, to the source device, the modified information related to the receipt of the packets by the receiving device.

20 Claims, 3 Drawing Sheets

MODIFYING FEEDBACK INFORMATION TO CONTROL A SOURCE DEVICE

BACKGROUND

The use of the Internet, and other networks, has been rapidly increasing for years. Recently, WiFi has become common place in not only private locations, but also public areas. When deployed over a large area, the WiFi signals may be broadcast from many different components/devices. Roaming is when a user moves between broadcasting devices, or is forcibly switched between broadcasting devices. Roaming may cause dropped packets and other hiccups in service through no fault of the network.

OVERVIEW

In general, in one aspect, embodiments relate to a non-transitory computer readable medium comprising instructions which, when executed by one or more processors cause performance of operations, comprising: receiving feedback information related to a receipt of a plurality of packets by a receiving device, the plurality of packets being transmitted by a source device, modifying the feedback information to obtain modified information related to the receipt of the plurality of packets by the receiving device, and transmitting, to the source device, the modified information related to the receipt of the plurality of packets by the receiving device.

In general, in one aspect, embodiments relate to a system. The system comprises at least one network device including a hardware processor, the system being configured to perform operations including: receiving feedback information related to a receipt of a plurality of packets by a receiving device, the plurality of packets being transmitted by a source device, modifying the feedback information to obtain modified information related to the receipt of the plurality of packets by the receiving device, and transmitting the modified information related to the receipt of the plurality of packets by the receiving device.

In general, in one aspect, embodiments relate to a method. The method comprises receiving feedback information related to a receipt of a plurality of packets by a receiving device, the plurality of packets being transmitted by a source device, modifying the feedback information to obtain modified information related to the receipt of the plurality of packets by the receiving device, and transmitting, to the source device, the modified information related to the receipt of the plurality of packets by the receiving device.

Other aspects and advantages will be apparent from the following description and the appended claims.

DETAILED DESCRIPTION

Figure 1:
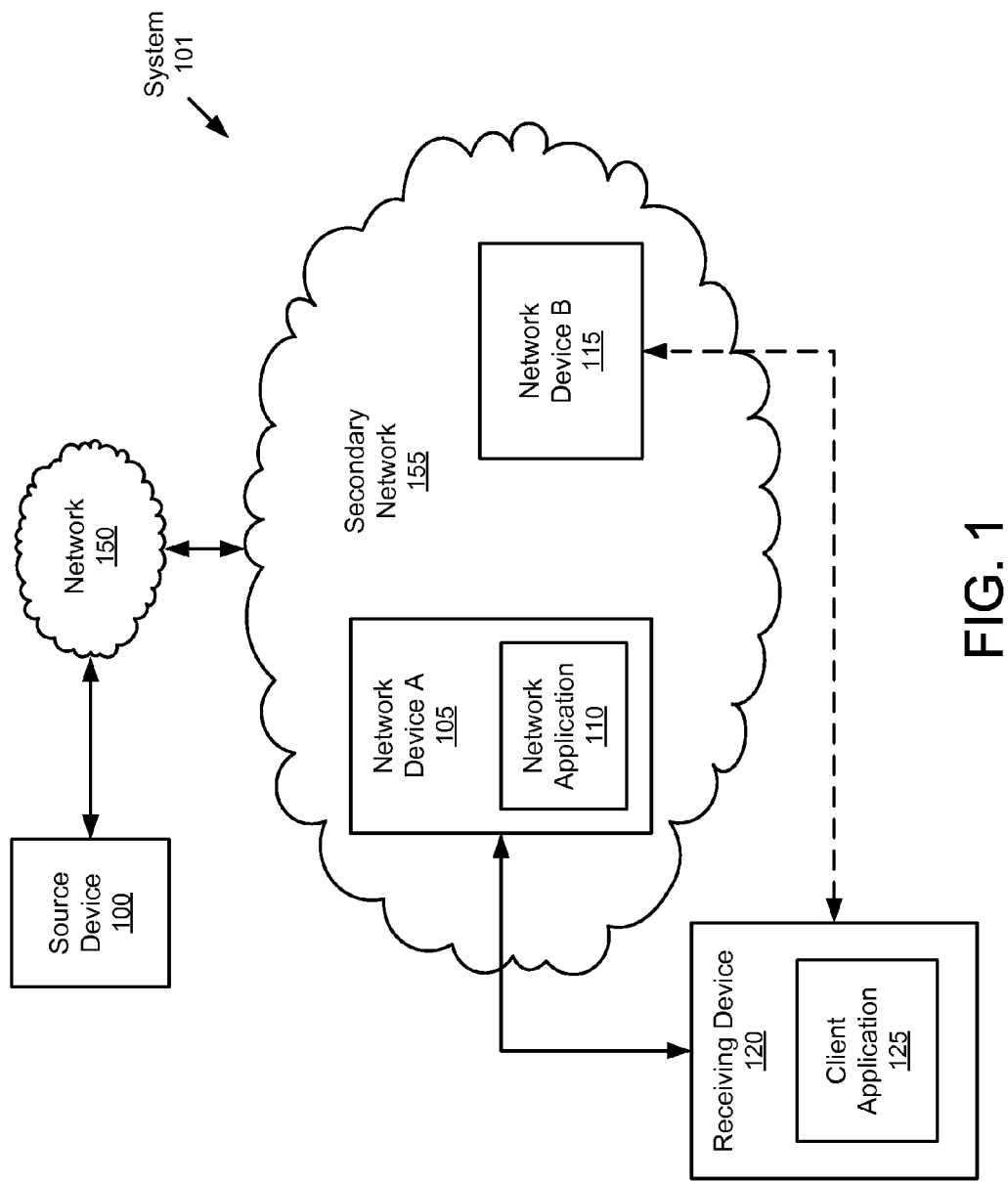
FIG. 1 shows a schematic diagram in accordance with one or more embodiments.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a computer readable medium, a method, and a system for modifying (e.g., deliberately falsifying) feedback information. The feedback information may include metrics and statistics regarding packets sent by a source device and received by a receiving device (e.g., client device). The modified feedback information is then sent to the source device in order to control the source device. In one or more embodiments, the feedback information corresponds to data/messages associated with the Real-time Transport Protocol (RTP) and RTP Control Protocol (RTCP).

As an initial note, RTP and RTCP are widely used transport and control protocols, typically used for delivering audio, video, and other data over networks. Examples of their use include, but are not limited to: streaming audio and video, as well as videoconferencing. When using RTP and RTCP, feedback information may be collected. Specifically, the feedback information may include sequence numbers for packets, sender reports, receiver reports, and other suitable data. For example, a cumulative number of packets lost may be maintained, the fraction of packets lost, total packets sent, total packets received, etc. Other kinds of data or statistics may also be maintained or tracked. Embodiments are not limited to RTP and RTCP, but rather apply to any protocol for transmitting data now known or later developed.

As WiFi networks become more ubiquitous, and consumers use more data, roaming occurs more frequently. Roaming occurs when a receiving device (e.g., client device) switches between the various network devices that transmit the WiFi signals. When roaming, packets intended for the receiving device may be dropped at no fault of the network. Typically, the existence of dropped packets would be reported to the source device, which would most likely reduce the amount of data sent in response. As an example, a source device may reduce the quality of streaming video from 720p to 360p in response to the report of dropped packets. These data reductions are usually handled automatically by the source, and are unable to be controlled by the receiving device. Typically, the source device does not know the context, cause, or trigger of the dropped packets. In other words, the source device does not know that the packets were dropped due to a roaming event, and therefore incorrectly assumes that the packets were dropped because of network congestion. However, the dropping of packets in response to, or during, a roaming event may not indicate an actual reduction in available network bandwidth, rather, it is an isolated incident. In fact, the roaming event will typically result in an improved connection for the user. Thus, by modifying (e.g., deliberately falsifying) the feedback information provided to the source device, it will appear to the source device that the packets were never dropped, and the behavior of the source device may be indirectly controlled. Modifying feedback information may be used to trigger the source device to increase or decrease the quality/quantity of data sent to the receiving device.

FIG. 1 shows a system (101) in accordance with one or more embodiments. As shown in FIG. 1, the system (101) has multiple components, including a source device (100), one or more network devices (e.g., network device A (105) and network device B (115)), and a receiving device (120).

In one or more embodiments, the source device (100) and the network devices (105, 115) are connected via the network (150). The network (150) may be a network of any size including the Internet. In one or more embodiments, the network devices (105, 115) are located within the same secondary network (155) (e.g., an IP subnet). In one or more embodiments, the source device (100) is in a different secondary network (e.g., different IP subnet) than the network devices (105, 115). In one or more embodiments, one or more of the source device (100), network device A (105), and network device B (115) may be located in the network (150). A network application (110) is executing on network device A (105) and a client application (125) is executing on the receiving device (120).

In one or more embodiments, source device (100) is a server, rack, computer, laptop, smart phone, tablet computer, or other suitable device that provides data to receiving device (120) via an intermediate device(s), such as network device(s) (105 and 115). For example, source device (100) may be a web server hosting a video that receiver device (120) is streaming. In one or more embodiments, source device (100) is owned, controlled, or operated, by a different party that owns, controls, or operates network device A (105) and/or network device B (115). Alternatively, source device (100) may be owned, controlled, or operated by the same party as network device A (105) and/or network device B (115). In one or more embodiments, source device (100) may be a network device, as described below.

In one or more embodiments, the receiving device (120) may be a computing system capable of wirelessly sending and/or receiving information. For example, the receiving device (120) may be a laptop computer, smart phone, personal digital assistant, tablet computer, or other mobile device.

In one or more embodiments, each network device (105 and 115) is a hardware device that is configured to receive packets (e.g., unicast packets, multicast packets) and transmit the packets to the receiving device(s) connected to the network device. A network device might also be configured to receive packets from a receiving device and transmit the packets to other network devices, and source devices. The network device may include one or more hardware processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor.

By way of an example, a receiving device may be directly wired or wirelessly communicatively connected to a single access point, which is directly communicatively connected to a single controller, which is connected to a network (not shown). In the example, the network device may be the access point, the controller, an access point that includes the functionality of a controller, a switch (e.g., mobility access switch), or other such device. Additionally, by way of an example, one network device may be a controller while another network device may be an access point. The network device that is the access point in the example may or may not be connected to the network via the network device that is a controller.

Access points are digital devices that may be communicatively coupled to one or more networks (e.g., Internet, an intranet, etc.). Access points may be directly connected to the one or more networks or connected via a controller. In other words, an access point may be directly connected to a particular controller. An access point may include a wireless access point (WAP) that communicates wirelessly with devices using Wi-Fi, Bluetooth or related standards and that communicates with a wired network.

The network application (110) includes functionality for determining when to modify feedback information, functionality for modifying the feedback information, and functionality to send the modified feedback information, as well as other functionalities as needed for implementing the embodiments. In one or more embodiments, network application (110) may be installed on every network device (105, 115) that forms a part of a given network, or may be installed on just selected network devices.

In one or more embodiments, network application (110) may determine that feedback information needs to be modified based on a receiving device recently roaming. The roam may be due to any reason such as the receiving device being closer to one network device than another, one network device being congested and forcibly switching a receiving device to a second network device, or any other reason. Network application (110) is able to identify and track a given receiving device, and therefore knows what network device is broadcasting to the receiving device and when a given receiving device has roamed from one network device to another. In one or more embodiments, this information is not available to source device (100). In one or more embodiments, network application (110) may determine that feedback information needs to be modified based on a type of packet received. Many different types of packets may be sent and/or received and the determination to modify feedback information may be based on any type of packet now known or later developed. Additionally, network application (110) may determine that feedback information needs to be modified for any other reason, based on information available to network application (110).

In one or more embodiments, network application (110) may modify the feedback information in any way now known or later developed. Further, any portion of the feedback information may be modified including, but not limited to: sequence numbers for packets, sender reports, receiver reports, cumulative number of packets lost, the fraction of packets lost, total packets sent, total packets received, etc. Further, network application (110) may send the modified feedback information in any manner now known or later developed, and may send it to any suitable destination, such as source device (100). It will be apparent to one of ordinary skill that there are many ways to modify and/or send feedback information and, as such, embodiments should not be limited to the above examples.

In one or more embodiments, client application (125) is a software application executing on the receiving device (120) that includes the functionality needed for interaction with the network devices. Client application (125) may be installed by the user of receiving device (120) or may come pre-installed by the manufacturer. In one or more embodiments, client application (125) is part of the operating system, or other standard pre-installed software, of receiving device (120), as the embodiments may be practiced without the installation of specialized software on client devices. In one or more embodiments, client application (125) issues the feedback information that will be modified or the already modified feedback information.

Figure 2:
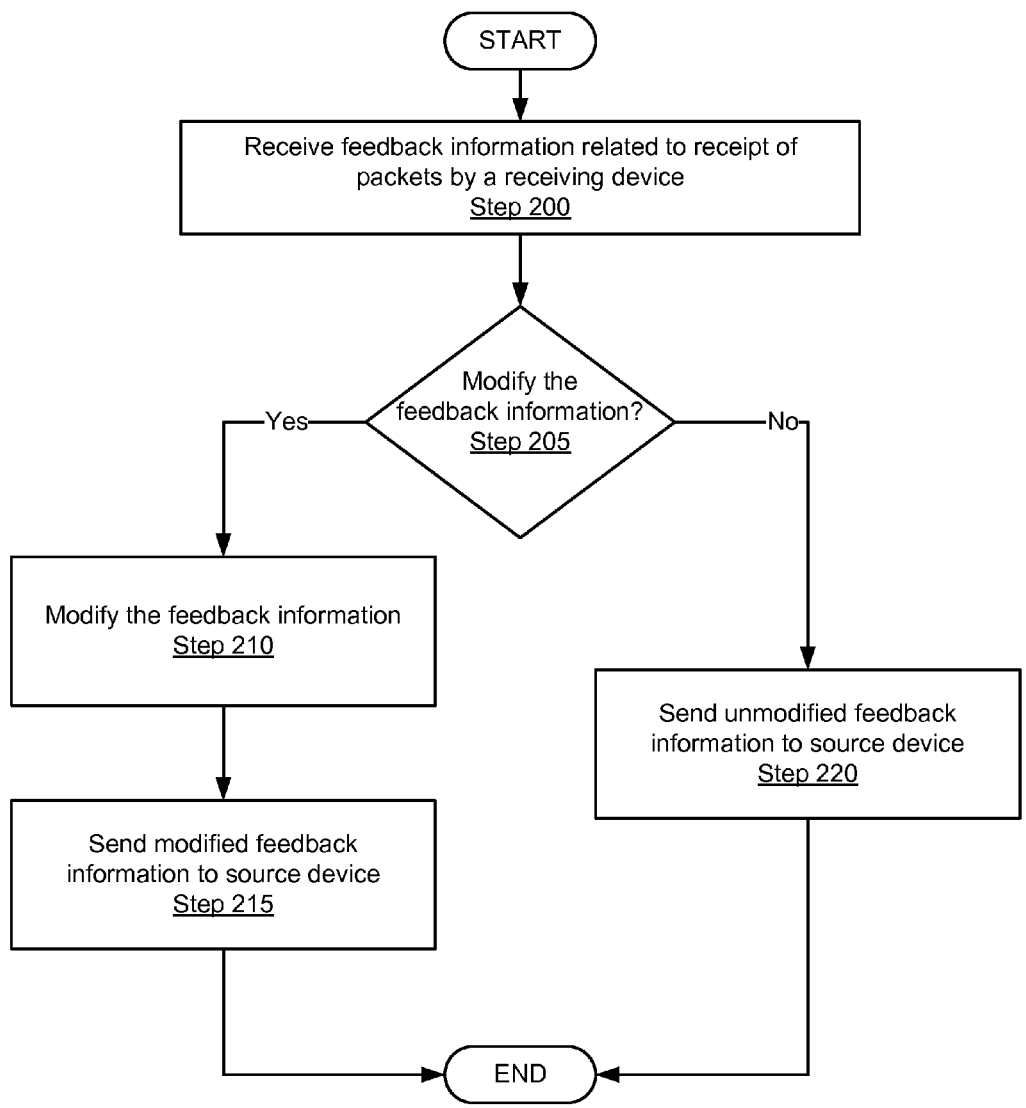
FIG. 2 shows a flowchart of a method in accordance with one or more embodiments.

FIG. 2 shows a flowchart depicting a process/method for modifying (e.g., deliberately falsifying) feedback information prior to delivering the feedback information to the source device. While the various steps in this flowchart are presented and described sequentially, one of ordinary skill in the art will appreciate that some or all of the steps may be executed in different orders and some or all of the steps may be executed in parallel. Further, in one or more embodiments, one or more of the steps described below may be omitted, repeated, and/or performed in a different order. Accordingly, the specific arrangement of steps shown in FIG. 2 should not be construed as limiting the scope of the embodiments.

In Step 200, feedback information related to the receipt of packets by a receiving device is received, in accordance with one or more embodiments. The feedback information may be any suitable information collected in the process of sending and receiving packets including, but not limited to: sequence numbers for packets, sender reports, receiver reports, cumulative number of packets lost, the fraction of packets lost, total packets sent, total packets received, Forward Error Correction (FEC) data, Institute of Electrical and Electronics Engineers (IEEE) 802.11 Acknowledgement (ACK) frames, etc. The feedback information may be collected by a receiving device, or an intermediate device, such as a network device of FIG. 1.

In Step 205, a determination is made whether to modify the feedback information, in accordance with one or more embodiments. The determination may be made based on any available knowledge and/or data including, but not limited to: expecting network conditions to improve (e.g., a class is about to end), expecting network conditions to deteriorate (e.g., a class is about to start and many users will be joining the network, etc), the clients connected to a given network device are about to be reorganized amongst the network devices for a more even workload, a receiving device just roamed, there is actual congestion, etc. It will be apparent to one of ordinary skill that the determination may be made on any information available to the intermediary devices (i.e., network devices) and that this information is not ordinarily available to the source device, and, as such, embodiments should not be limited to the above examples. If the feedback information does not need to be modified, the method proceeds to Step 220. If the feedback does need to be modified, the method proceeds to Step 210.

In Step 210, the feedback information is modified, in accordance with one or more embodiments. Modifying feedback information may include, but is not limited to: deleting a report (i.e., preventing a report/message from reaching the source device), adding a report, omitting information, adding information, providing incorrect information, deliberately falsifying statistics/metrics, etc. In one or more embodiments, feedback information is modified to prevent the source device from decreasing the quantity/quality of the data being sent. In one or more embodiments, feedback information is modified to trigger the source device to decrease the quantity/quality of the data being sent. For example, the feedback information may be deliberately falsified to give the illusion that the network is suffering from congestion (i.e., many packets are being dropped) and trigger the source device to reduce the quantity/quality of the data being sent. It will be apparent to one of ordinary skill that the feedback information may be modified in any way and, as such, embodiments should not be limited to the above examples.

In Step 215, the modified feedback information is sent to the source device, in accordance with one or more embodiments. The modified feedback information may be sent to the source device in any manner now known or later developed.

In Step 220, the unmodified feedback information is sent to the source device, in accordance with one or more embodiments. After Step 220, the method ends. The unmodified feedback information may be sent to the source device in any manner now known or later developed.

The following section describes various examples. The examples are included to aid in the understanding of the embodiments and are not intended to limit scope.

As a first example, a large college class is about to begin. Typically, all of the students in the class log on to the WiFi network and use large amounts of bandwidth watching videos online. Although packets have not yet been dropped, the network is aware of this usage pattern and, as the students sign on to the network using their various client devices, the feedback information being sent from the various client devices is modified to show that packets are being dropped. In response to the modified feedback information, the quality of the student's videos will be reduced by the source devices, thereby lowering the stress on the network and reducing the likelihood that packets will actually be dropped.

As a second example, a user is streaming video on her smartphone while at the public library on the public library's WiFi. While walking around the library, the user roams from a first network device to a second network device, and packets are dropped. Ordinarily, this may result in a reduction in video quality from the source based on the dropped packets. However, the network devices are aware of this roam, and the fact that the packets were dropped because of the roam. Thus, the network devices modify the feedback information to show that no packets were dropped before the feedback information is sent to the source. Thus, when the source receives the modified feedback information the feedback information shows that no packets have been dropped, and the video continues to stream at the same quality.

Figure 3:
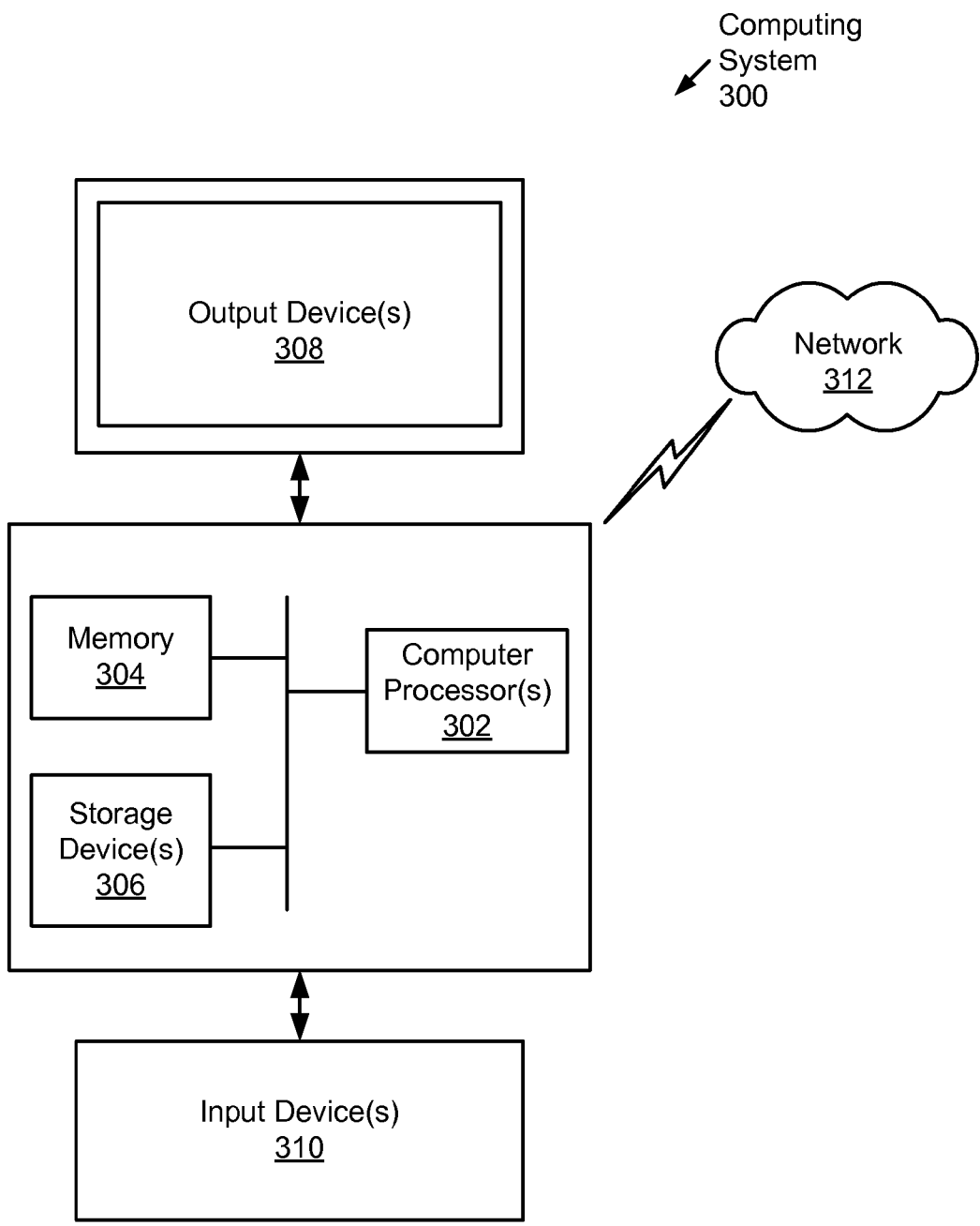
FIG. 3 shows a computer system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 3, the computing system (300) may include one or more computer processor(s) (302), associated memory (304) (e.g., random access memory (RAM), cache memory, flash memory, etc.), one or more storage device(s) (306) (e.g., a hard disk, an optical drive such as a compact disk (CD) drive or digital versatile disk (DVD) drive, a flash memory stick, etc.), and numerous other elements and functionalities. The computer processor(s) (302) may be an integrated circuit for processing instructions. For example, the computer processor(s) may be one or more cores, or micro-cores of a processor. The computing system (300) may also include one or more input device(s) (310), such as a touchscreen, keyboard, mouse, microphone, touchpad, electronic pen, or any other type of input device. Further, the computing system (300) may include one or more output device(s) (308), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (300) may be connected to a network (312) (e.g., a local area network (LAN), a wide area network (WAN)

such as the Internet, mobile network, or any other type of network) via a network interface connection (not shown). The input and output device(s) may be locally or remotely (e.g., via the network (312)) connected to the computer processor(s) (302), memory (304), and storage device(s) (306). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (300) may be located at a remote location and connected to the other elements over a network (312). Further, embodiments may be implemented on a distributed system having a plurality of nodes, where each portion of an embodiment may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions which, when executed by one or more processors cause the one or more processors to: receive feedback information related to a receipt of a plurality of packets by a receiving device, the plurality of packets being transmitted by a source device;
    modify the feedback information with falsified information to obtain modified information related to the receipt of the plurality of packets by the receiving device; and
    transmit, to the source device, the modified information related to the receipt of the plurality of packets by the receiving device,
    wherein the instructions are to cause the one or more processors to modify the feedback information at least in response to a determination that a network configuration is to be modified, wherein the modification of the network configuration is to improve the success rate for transmission of data to the receiving device.

2. The medium of claim 1, wherein the modified information comprises falsified information.

3. The medium of claim 1, wherein the instructions are to cause the one or more processors to modify the feedback information at least in response to a determination that the receiving device is roaming from one access point to another access point.

4. The medium of claim 1, wherein to modify the feedback information, the instructions are to cause the one or more processors to:
    determine a type of packet related to a portion of the feedback information; and
    determine whether to modify the portion of the feedback information based on the type of the packet.

5. The medium of claim 1, wherein to modify the feedback information, the instructions are to cause the one or more processors to:
    determine a first subset of the plurality of packets that were received by the receiving device; and
        based at least on the first subset of the plurality of packets that were received, determine whether to modify feedback information corresponding to a second subset of the plurality of packets that were not received by the receiving device.

6. The medium of claim 1, wherein to modify the feedback information, the instructions are to cause the one or more processors to:
    determine that error information, indicated in the feedback information, is associated with a plurality of packets that were (a) received from the source device by an intermediate device and (b) not transmitted by the intermediate device to the receiving device.

7. The medium of claim 1, wherein to modify the feedback information, the instructions are to cause the one or more processors to remove an indication of packet loss errors from the feedback information, the indication of packet loss errors being based on the receiving device failing to receive one or more packets.

8. The medium of claim 7, wherein to remove the indication of packet loss errors, the instructions are to cause the one or more processors to discard at least one report with feedback information of a plurality of reports with feedback information.

9. The medium of claim 1, wherein to modify the feedback information, the instructions are to cause the one or more processors to add a falsified indication of packet loss errors to the feedback information, the indication of packet loss errors indicating errors that were not reported by the receiving device.

10. The medium of claim 9, wherein to add an indication of packet loss errors to the feedback information, the instructions are to cause the one or more processors to generate a report with feedback information and to transmit the report with the feedback information to the source device.

11. The medium of claim 9, wherein the instructions are to cause the one or more processors to add the indication of packet loss errors in response to a determination that a number of client devices is to be increased.

12. The medium of claim 9, wherein the instructions are to cause the one or more processors to add the indication of packet loss errors to the feedback information in response to a determination that the amount of data transmitted by the source device is to be reduced.

13. The medium of claim 9, wherein the instructions are to cause the one or more processors to add the indication of packet loss errors to the feedback information in response to a determination that a quality of video, corresponding to the plurality of frames, is to be reduced.

14. The medium of claim 1, wherein the feedback information is based on IEEE 802.11 ACK frames received by a particular device that transmits the plurality of frames directly to the receiving device.

15. The medium of claim 1, wherein the plurality of packets are transmitted by the source device through an intermediate device to the receiving device.

16. A network device comprising:
a hardware processor;
a memory on which is stored instructions that are to cause the hardware processor to:
receive feedback information related to a receipt of a plurality of packets by a receiving device, the plurality of packets being transmitted by a source device;
modify the feedback information with falsified information to obtain modified information related to the receipt of the plurality of packets by the receiving device; and
transmit the modified information related to the receipt of the plurality of packets by the receiving device,
wherein the instructions are to cause the hardware processor to modify the feedback information at least in response to a determination that a network configuration is to be modified, wherein the modification of the network configuration is to improve the success rate for transmission of data to the receiving device.

17. The network device of claim 16, wherein the instructions are to cause the hardware processor to modify the feedback information at least in response to a determination that the receiving device is roaming from one access point to another access point.

18. The network device of claim 16, wherein the instructions are to cause the hardware processor to modify the feedback information through removal of an indication of packet loss errors from the feedback information, the indication of packet loss errors being based on the receiving device failing to receive one or more packets.

19. The network device of claim 16, wherein the instructions are to cause the hardware processor to add a falsified indication of packet loss errors to the feedback information in response to a determination that an amount of data transmitted by the source device is to be reduced.

20. A method, comprising:
receiving feedback information related to a receipt of a plurality of packets by a receiving device, the plurality of packets being transmitted by a source device;
modifying the feedback information with falsified information to obtain modified information related to the receipt of the plurality of packets by the receiving device, wherein the modification is to improve the success rate for transmission of data to the receiving device; and
transmitting, to the source device, the modified information related to the receipt of the plurality of packets by the receiving device.

* * * * *